(12) United States Patent
De La Maza Uriarte

(10) Patent No.: US 9,958,249 B2
(45) Date of Patent: May 1, 2018

(54) INDEXING HEAD WITH TWO ROTATING AXES

(71) Applicant: UNIMETRIK, S.A., Legutiano (ES)

(72) Inventor: Borja De La Maza Uriarte, Las Arenas (ES)

(73) Assignee: Unimetrik, S.A., Legutiano, Alava (ES)

( * ) Notice: Subject to any disclaimer, the term of this patent is extended or adjusted under 35 U.S.C. 154(b) by 566 days.

(21) Appl. No.: 14/162,461

(22) Filed: Jan. 23, 2014

(65) Prior Publication Data

US 2015/0158136 A1    Jun. 11, 2015

Related U.S. Application Data

(63) Continuation of application No. PCT/ES2013/070869, filed on Dec. 11, 2013.

(51) Int. Cl.
*B23Q 16/06* (2006.01)
*G01B 5/00* (2006.01)

(52) U.S. Cl.
CPC ......... *G01B 5/0002* (2013.01); *Y10T 74/1471* (2015.01)

(58) Field of Classification Search
CPC ...... B23Q 16/06; B23Q 16/065; B23Q 16/08; B23Q 16/083; B23Q 16/086; B23Q 16/10; B23Q 16/102; B23Q 16/105; B23Q 16/107; B23Q 16/001; B23Q 16/004; B23Q 16/006; B23Q 16/04; B23Q 16/12; Y10T 74/14; Y10T 74/1459; Y10T 74/1465; Y10T 74/1494; Y10T 74/1453; Y10T 74/1476; Y10T 74/1471; Y10T 74/1474;

(Continued)

(56) References Cited

U.S. PATENT DOCUMENTS

| 2,547,616 | A | 4/1951 | Beekman |
| 5,084,981 | A | 2/1992 | McMurtry et al. |
| 5,088,337 | A | 2/1992 | Bennett |
| 7,213,344 | B2 * | 5/2007 | Jordil ..................... G01B 5/012 33/556 |
| 2004/0154177 | A1 | 8/2004 | Jordil et al. |

(Continued)

FOREIGN PATENT DOCUMENTS

| GB | 2298488 | 9/1996 |
| GB | 2298488 A | 9/1996 |

(Continued)

OTHER PUBLICATIONS

International Search Report for PCT/ES2013/070869, filed on Dec. 11, 2013.

(Continued)

*Primary Examiner* — Richard W Ridley
*Assistant Examiner* — Brian J McGovern
(74) *Attorney, Agent, or Firm* — Notaro, Michalos & Zaccaria P.C.

(57) ABSTRACT

Indexing head with two rotating axes, with a first rotating axis A perpendicular to the fixing direction with regard to the mode of operation of the head, and with a second rotating axis B of the fixing direction, in turn defining an upper part of the fixed head in relation to the B axis and a lower part of the head, which moves in relation to axes A and B; and which has a principal servomotor A (40) and a position locking mechanism on the A axis arranged 10 on the part of the lower head; and a principal servomotor B (21) for rotation on the B axis with a position locking mechanism on the B axis arranged on said upper part of the head.

1 Claim, 11 Drawing Sheets

(58) Field of Classification Search
CPC ............. Y10T 74/1418; Y10T 74/1412; Y10T 74/1435; Y10T 74/1447; G01B 21/047; G01B 21/04; G01B 5/012; G01B 5/0002; G01B 5/0004; G01B 5/0007; G01B 5/0009; G01B 5/0028; G01B 5/008; G01B 5/004; G01B 5/016; B25J 17/025; B25J 17/033; B25J 17/0258; B25J 17/0266; B25J 17/0275; B25J 17/0283; B25J 17/0291
USPC .......... 74/89.23, 56, 866.5, 325, 331, 337.5, 74/490.07, 490.06, 490.03, 490.08, 74/490.09, 490.05; 901/23, 24, 25, 26
See application file for complete search history.

(56) References Cited

U.S. PATENT DOCUMENTS

| | | |
|---|---|---|
| 2006/0112578 A1 | 6/2006 | Jordil et al. |
| 2010/0325863 A1 | 12/2010 | Wallace |

FOREIGN PATENT DOCUMENTS

| | | | | |
|---|---|---|---|---|
| JP | 2006095668 A * | 4/2006 | ............ | B23Q 16/10 |
| WO | WO 2013030958 A1 * | 3/2013 | ............ | B25J 9/0096 |

OTHER PUBLICATIONS

Supplementary European Search Report for EP 13 89 4062, filed on Apr. 1, 2015.

* cited by examiner

INDEXING HEAD WITH TWO ROTATING AXES

CROSS-REFERENCE TO RELATED APPLICATION

This is a continuation of International Patent Application No. PCT/ES2013/070869, filed Dec. 11, 2013, which is incorporated here by reference and on which priority is claimed.

OBJECT OF THE INVENTION

The object of the invention is an indexing head with two axes of rotation which makes it possible to move objects connected to the indexing head, such as an optical scanner, for example, and whose distinctive feature lies in the fact that the indexing head has two independent mechanisms to control locking of the two axes of rotation.

STATE OF THE ART

Indexing heads are heads with an ability to repeat the position determined by the user as many times as required. Heads used nowadays are directed electronically.

U.S. Pat. No. 5,088,337 describes a head which can be used to position a probe mounted on a coordinate positioning machine. This head is mounted on the machine using a fixed support. The head has a rotor which rotates around a vertical axis, according to the plane of the drawing, and a rotating element, which houses the probe and performs a second rotation around an axis orthogonal to the first. The different positions are fixed by means of an array of ball bearings and cooperating rollers, arranged circumferentially around the two rotating axes. The locking and unlocking of a given position is carried out by a manual mechanism common to both axes. This mechanism consists of a right angle bracket which pivots on a support because of the retraction of a bar, located in the vertical rotating axis, which pushes the rotating element to couple with the side wall of the rotor. The bar is moved manually using a wheel which rotates a lever, the rotation of which displaces a bar, joined transversally to the bar. This movement is the one which causes the coupling and uncoupling of the rotor with regard to the fixed portion or support, thus also locking and unlocking the first rotation.

Meanwhile, the UK patent document GB2298488A operates according to principles similar to the above, with the difference that the movement of the right angle bracket is produced by a locking motor. This motor rotates an axis between two predetermined angular positions, which correspond to locking and unlocking of the head. A cable passes around a pulley, mounted on the base, and is connected by its end furthest from the axis to the right angle bracket-shaped drive device, similar to the one described earlier. When the motor operates, it rotates the axis, pulling the locking lever (part of the right angle bracket) upwards and withdrawing the rotor from its indexed position, pushing another rotor upwards to couple with the base. On the other hand, reverse rotation of the axis would have the opposite effect on the rotors indicated.

DESCRIPTION OF THE INVENTION

The object of the invention relates to an indexing head with two principal axes of rotation. The first principal axis of rotation (A) corresponds to a horizontal axis, and the second principal axis of rotation (B) corresponds to a vertical axis. The indexing head has an upper part and a lower part, the lower part being movable relative to the upper part. The terms "horizontal," "vertical," "upper," and "lower" refer to the conventional orientation shown in the figures and also to the orientation in which the indexing head is used, however, the indexing head can be used with any orientation in space.

The indexing head relates to the ability to repeat the position. The repetition of the position is achieved as a result of the following process:
 a) Unlocking the initial position of the lower part;
 b) Rotating the lower part about the first principal axis of rotation (A) and/or the second principal axis of rotation (B) to a new position determined by the user;
 c) Locking the lower part in the new position.

When the system is locked, the lower part cannot move relative to the upper part, which is achieved by using an upper locking mechanism and a lower locking mechanism. Each of the upper locking mechanism and the lower locking mechanism includes a respective array of locking cylinders and locking balls. The respective locking balls are placed in a circumference, in an ordered fashion, with a 5° separation between them. Meanwhile, there are three pairs of the respective locking cylinders, each pair of the respective locking cylinders separated from each other by an angle of 120°.

The indexing head includes an upper rotation mechanism and a lower rotation mechanism. Each of the upper and lower rotation mechanism includes a respective principal servomotor for rotating the indexing head about either the first principal axis of rotation (A) or the second principal axis of rotation (B). Once the respective principal servomotors cause the indexing head to reach the position determined by the user, the upper locking mechanism and lower locking mechanism are activated to fix the established position. This means that the respective principal servomotors are only working during the process of securing and releasing, guaranteeing the position mechanically, which provides a saving in energy consumption and improvement in useful life of the respective principal servomotors, as the respective principal servomotors only operate when in movement and do not operate when the desired position is reached.

Meanwhile, a rotation range of ±105° is guaranteed about the first principal axis of rotation (A). This means that rotation about the first principal axis of rotation (A) is possible without activating the upper locking mechanism which is used to lock rotation about the second principal axis of rotation (B), which consequently, reduces wear and tear on the mechanical components of the upper locking mechanism and improves durability of the upper locking mechanism. Meanwhile, the upper locking mechanism returns to its initial position thanks to the force exercised by two springs in direction parallel to the second principal axis of rotation (B). The force applied by these springs can be regulated using a force varying mechanism.

Throughout the description and the claims, the word "comprises" and variants thereof are not intended to exclude other technical characteristics, additions, components or steps. For experts in the subject, other objects, advantages and characteristics of the invention will be gleaned in part from the description and in part from the practice of the invention. The following examples and drawings are provided for illustrative purposes, and are not intended as a restriction on this invention. In addition, this invention covers all the possible combinations of particular and preferred embodiments indicated here.

BRIEF DESCRIPTION OF THE DRAWINGS

Below is a very brief description of a series of drawings which help to understand the invention better and which are expressly related to an embodiment of said invention presented as a non-restrictive example thereof.

DESCRIPTION OF A PREFERRED EMBODIMENT OF THE INVENTION

Figure 1:
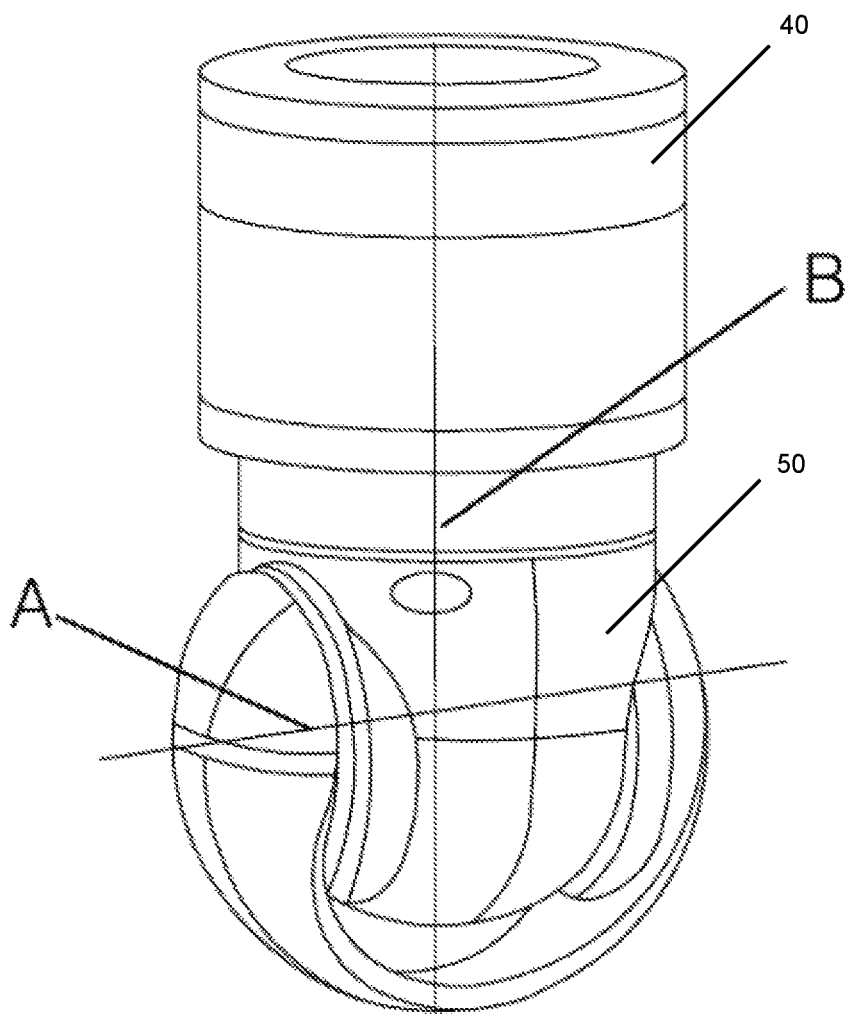
FIG. 1—Shows an image of the indexing head which is the subject of the invention, showing the first (A) and second (B) principal axes of rotation.
Figure 2:
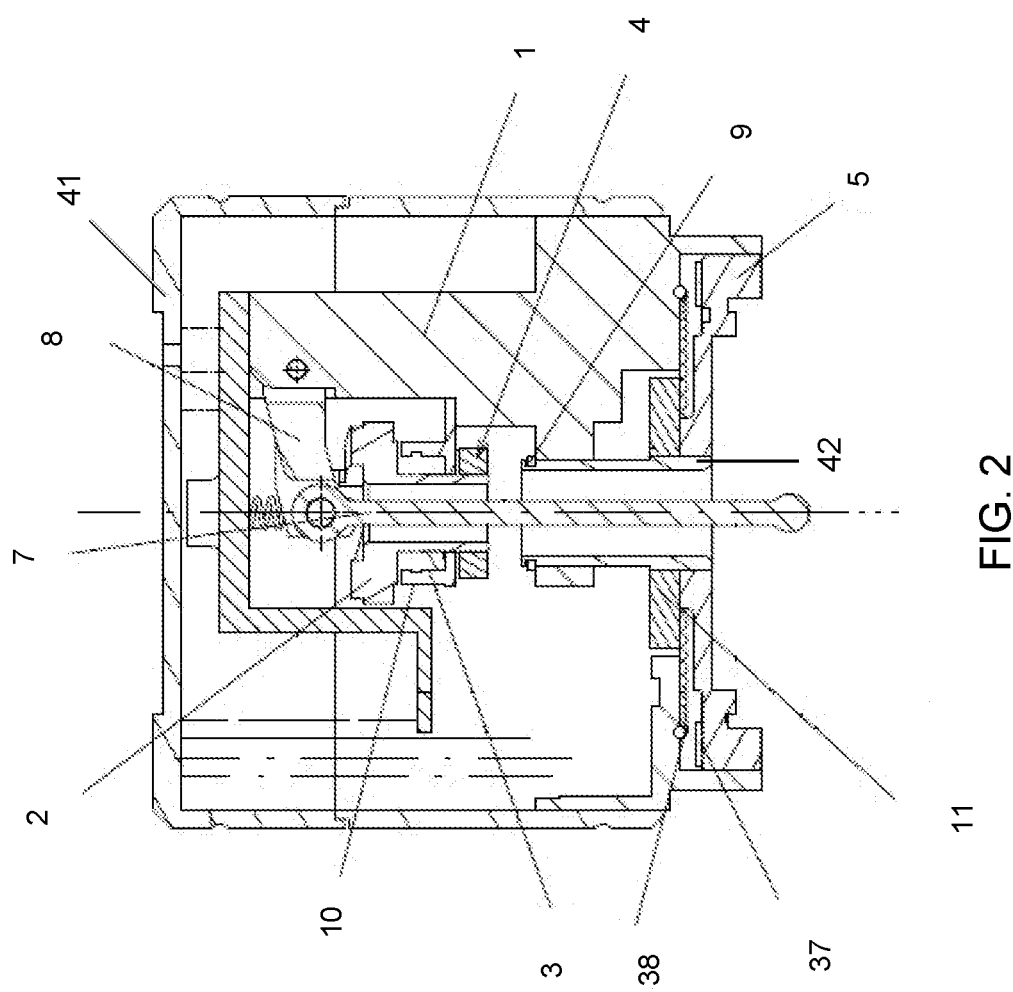
FIG. 2—Shows the cross section of the upper locking mechanism in the upper unlocked position.

FIG. 1 illustrates the indexing head which comprises an upper part (40) and a lower part (50). FIG. 2 illustrates the upper locking mechanism in detail. The upper locking mechanism, in an upper locked position, locks rotation of the lower part (50) relative to the upper part (40) about the second principal axis of rotation (B). The upper part (40) includes an upper housing (41) and an upper base (1). The upper base (1) is considered a reference part for relative movement of the lower part (50). In other words, the upper base (1) does not move relative to the lower part (50). The upper base (1) houses an upper driving gear (11), the upper driving gear (11) being used to rotate the lower part (50) about the second principal axis of rotation (B) when the upper locking mechanism in the upper unlocked position. A supporting rod (7) is connected to a lower casing (5). The lower casing (5) is connected to an upper sleeve (42). An upper part of the upper sleeve (42) includes a ring (9) that rests on the upper base (1) when the upper locking mechanism is in the upper unlocked position.

Located on the upper base (1) is an array of upper locking balls (38) which are arranged circumferentially in an ordered manner and with a separation of 5° between them about the second principal axis of rotation (B). Three pairs of upper locking cylinders (37), each pair of upper locking cylinders separated from each other by an angle of 120°, are arranged on the lower casing (5) which moves in relation to the upper base (1).

Figure 4:
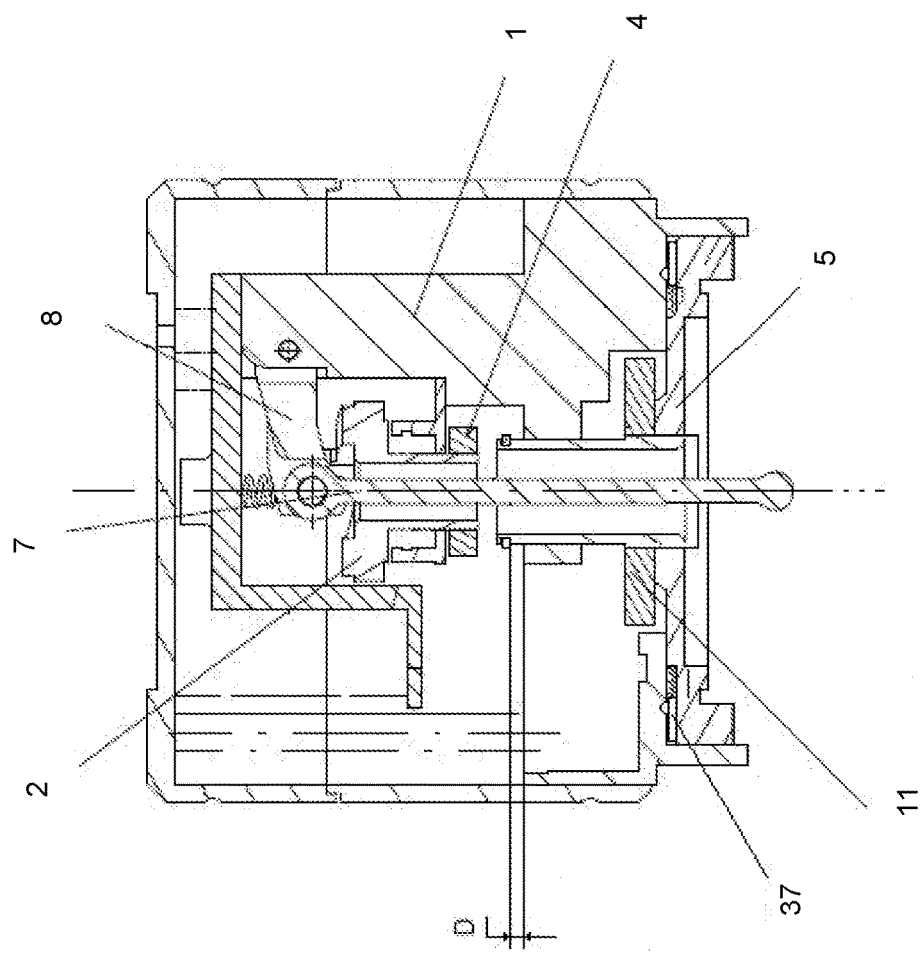
FIG. 4—Shows the cross section of the upper locking mechanism in the upper locked position.

FIG. 4 shows the upper locking mechanism in the upper locked position such that the lower part (50) has been moved towards the upper part (40). FIG. 4 shows how rotation of an anchor gear (4), through a lever (2) s that is connected to the anchor gear (4), causes the upper locking mechanism, which includes the supporting rod (7), the lower casing (5), and an L-shaped part (8), to reach the upper locked position by moving the combination of the lower casing (5), the upper driving gear (11), and the upper sleeve (42) upwards, moving a referenced distance (D), such that the upper locking balls (38) and the upper locking cylinders (37) come into contact, the contact between the upper locking balls and the upper locking cylinders preventing any rotation between the upper base (1) and the lower casing (5).

The operation of the upper locking system is relatively simple. Rotation of the anchor gear (4) causes rotation of the lever (2) which causes the L-shaped part (8) to slide along the lever (2). The sliding occurs on two ball bearings (30) of the L-shaped part (8) which the L-shaped part (8) incorporates to reduce friction. The lever (2) forces the L-shaped part (8) to rotate about a transverse axis, which raises the supporting rod (7) and, consequently, the entire lower part (50) of the indexing head.

Rotation of the anchor gear (4) and the lever (2) causes the lower part (50) of the indexing head to move vertically until the upper locking mechanism, through the upper locking balls (38) and the upper locking cylinders (37), blocks any permitted movement.

Figure 3:
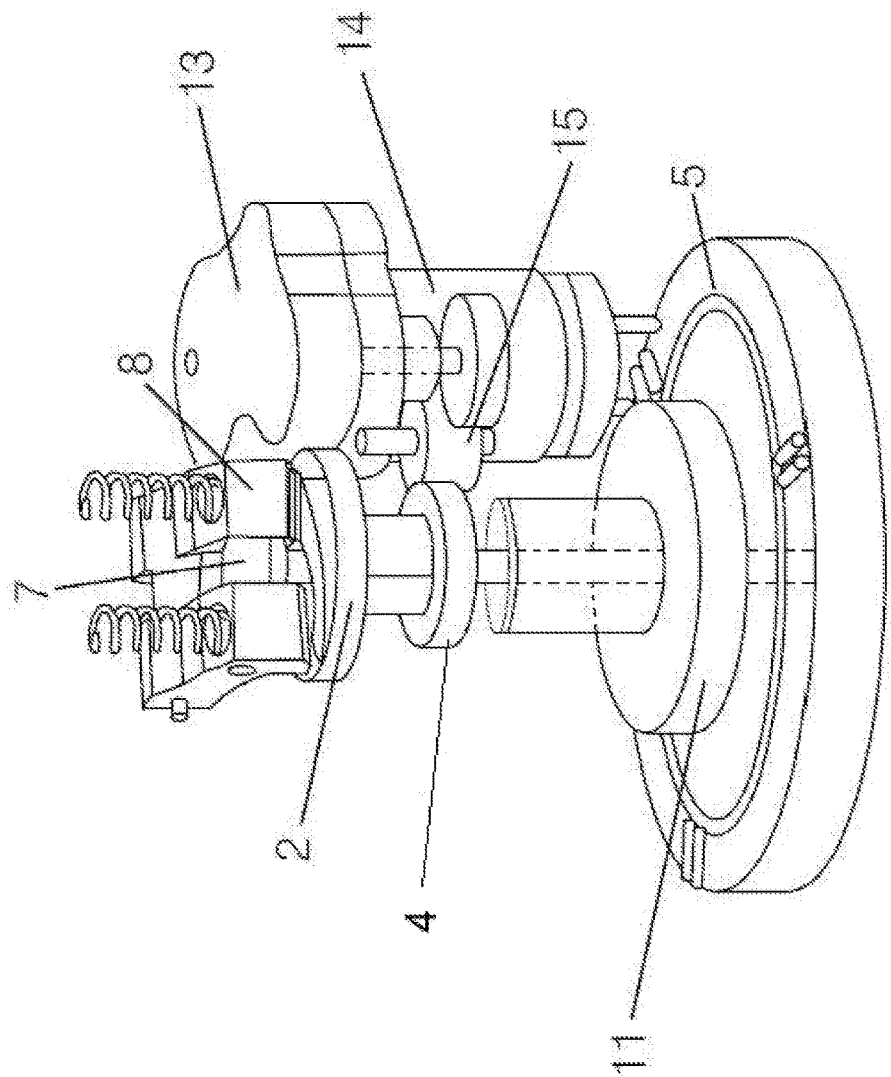
FIG. 3—Shows a first view in detail of the upper locking mechanism in the upper unlocked position.
Figure 5:
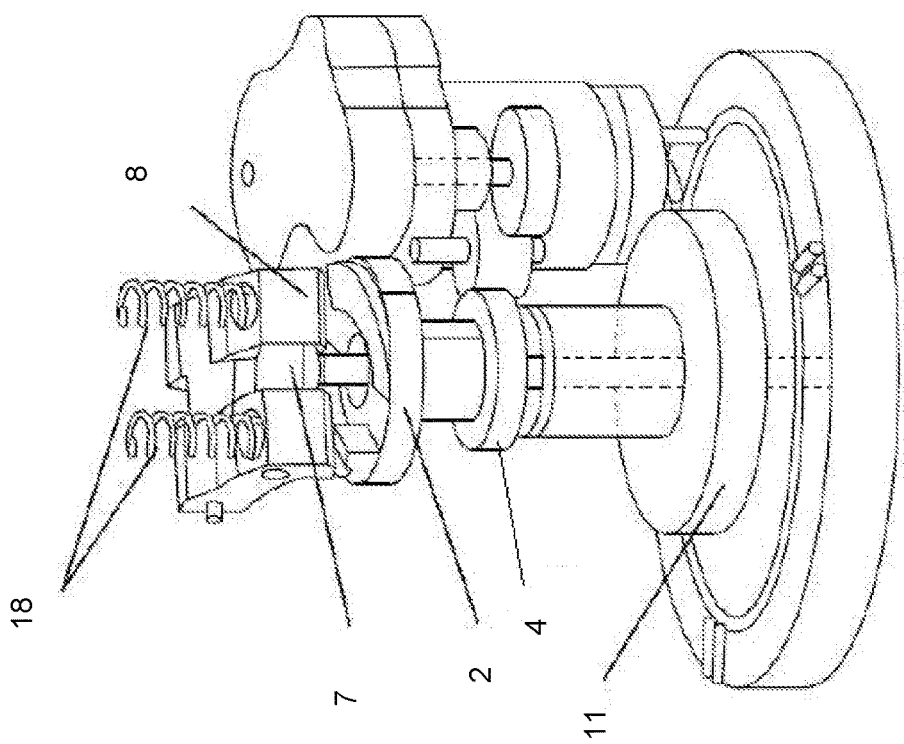
FIG. 5—Shows a first view in detail of the upper locking mechanism in the upper locked position.

The difference between the initial and final positions of the critical components which make up the upper locking mechanism is shown in FIGS. 2 to 4. In FIGS. 2 and 3, the lower part (50) is in its initial position, i.e. when the upper locking mechanism is in the upper unlocked position, whereas in FIGS. 4 and 5 the anchor gear (4) and lever (2) have rotated, rotating the L-shaped part (8) about the transverse axis in a first transverse rotational direction and thus raising the supporting rod (7), the lower casing (5), the upper driving gears (11) and consequently the lower part (50) of the indexing head, such that the lower part (50) in its final position, i.e. when the upper locking mechanism is in the upper locked position.

Rotation of the anchor gear (4) is controlled by an upper secondary servomotor (14) which is activated when the upper secondary servomotor (14) receives a signal from a controller. The upper secondary servomotor (14) is associated with an upper secondary reduction gear (13) which reduces the output speed of the upper secondary servomotor (14) and at the same time increases the torque. The upper secondary reduction gear (13) is connected to an upper secondary transmission system (15) which is what causes the anchor gear (4) to rotate and consequently lock or unlock the lower part (50).

For rotation of the anchor gear (4) and lever (2) to be more effective, the lever (2) is guided by ball bearings (3) which are inserted in a positioning disc (10).

Figure 6:
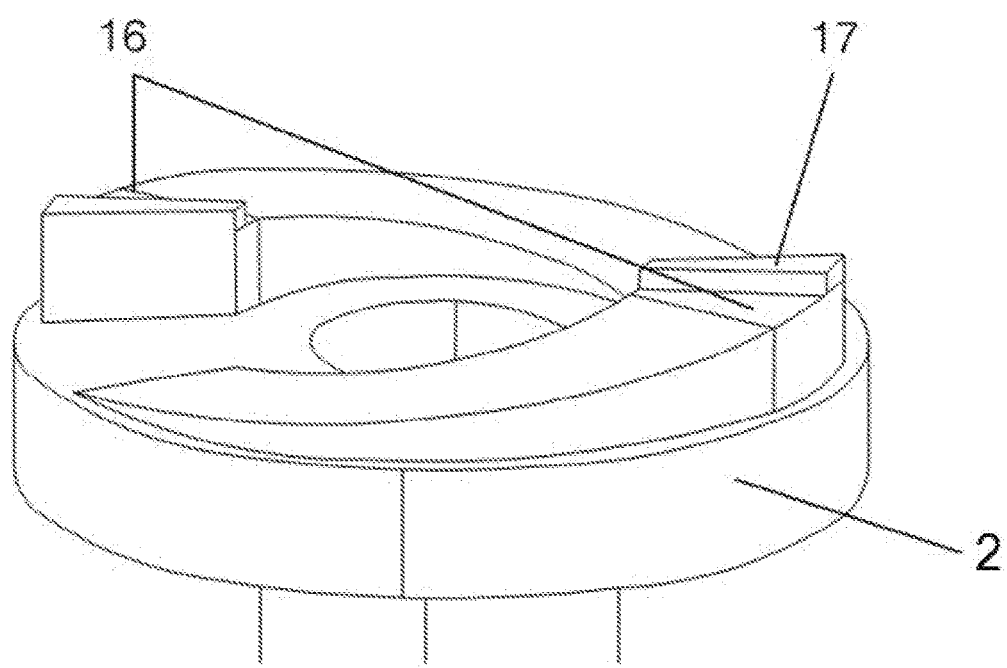
FIG. 6—Shows a detail of the flat rest areas and stops.

To allow the upper locking mechanism to stay in the upper locked position, the lever (2) has two flat areas (16), perpendicular to the second principal axis of rotation (B), and where there is no danger of the upper locking mechanism returning to the upper unlocked position. In addition, to prevent the upper locking mechanism from returning to the upper unlocked position, the lever has a respective stop (17) circumferentially adjacent to each respective flat area (16). All of this can be seen in FIG. 6.

Figure 7:
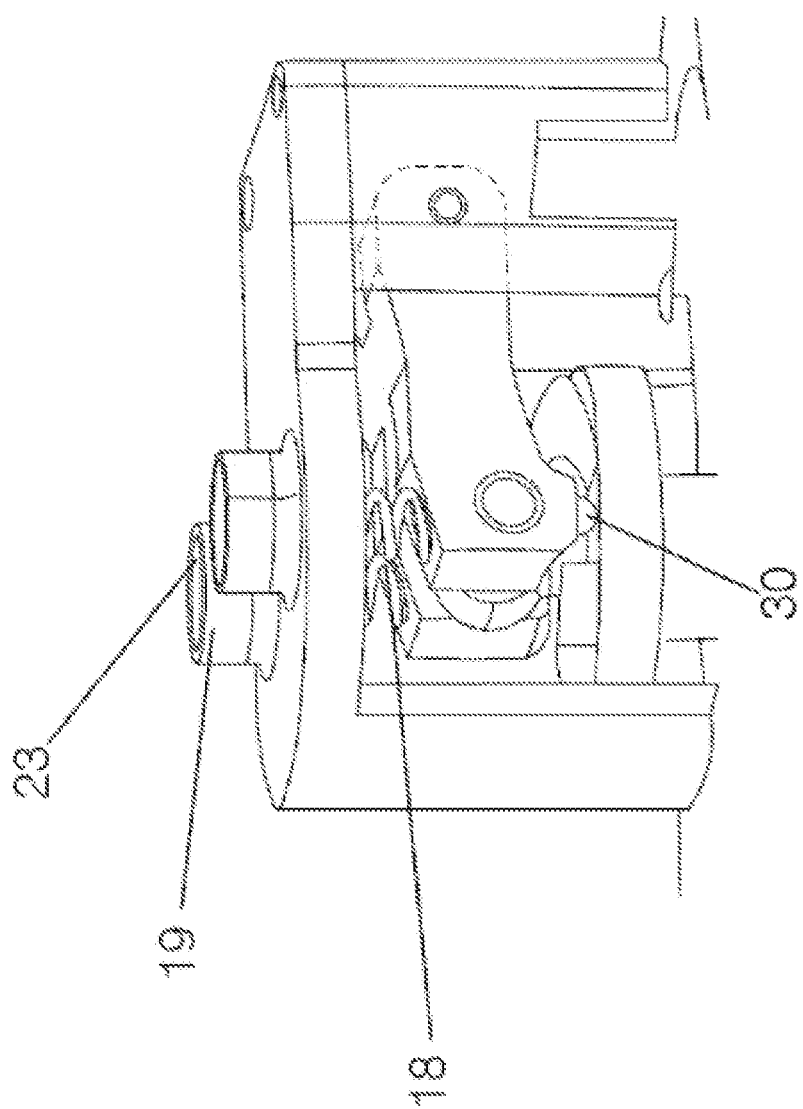
FIG. 7—Shows a detail of the system which guarantees return to the upper unlocked position.

To enable the lower part (50) to return to its initial position (i.e., when the upper locking mechanism is in the upper unlocked position), two springs (18) are incorporated, with a pre-load capacity to apply greater or lesser force to the L-shaped part (8) in the releasing process and parallel to the second principal axis of rotation (B). These springs (18) are preloaded by means of two set screws (23) which screw into openings (19) which can be seen in FIG. 7. Depending on how tightly the set screws (23) are screwed in, the springs (18) will be preloaded to a greater or lesser extent.

Figure 8:
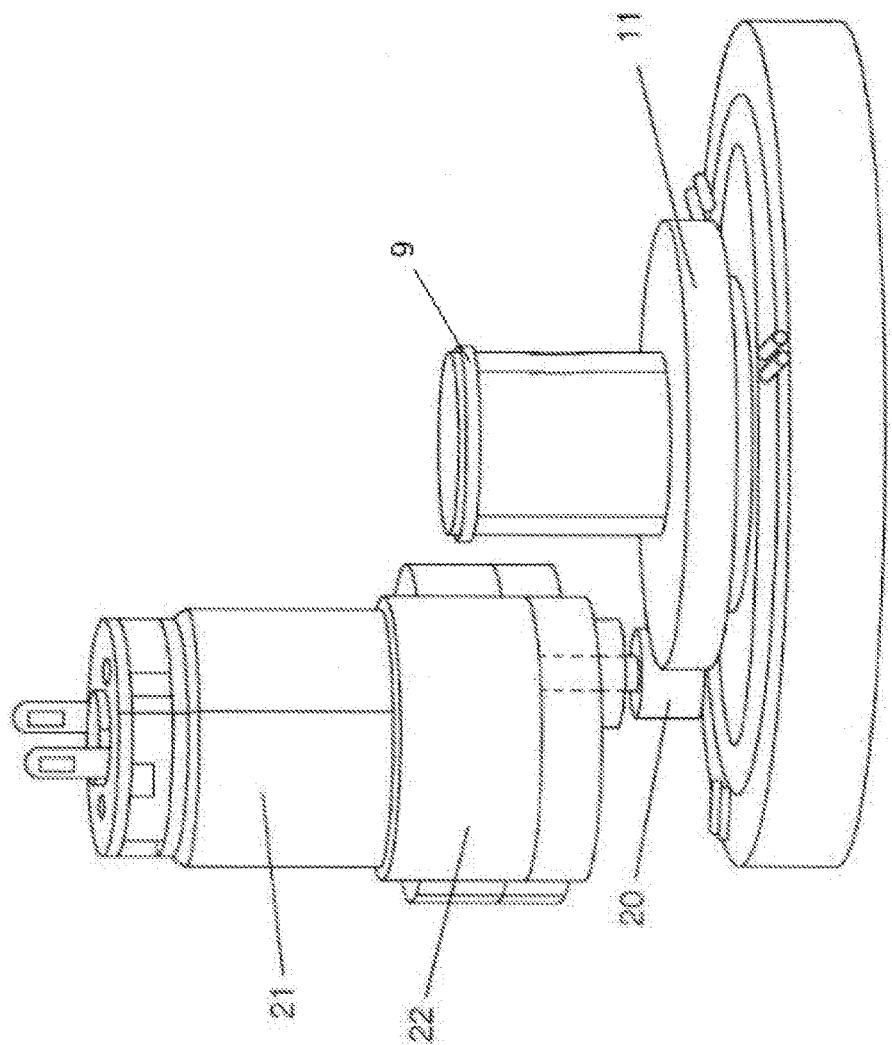
FIG. 8—Shows a detail of the rotating operation for the lower part about the second principal axis of rotation (B).

As can be seen in FIG. 8, once the upper locking mechanism has released the lower part (50), an upper principal servomotor (21) receives a signal to rotate the lower part (50) about the second principal axis of rotation (B) to the position desired by the user. The upper principal servomotor (21), as with the upper secondary servomotor (14), is associated with an upper primary reduction gear (22) which reduces the output speed of the upper principal servomotor (21) while at the same time increasing the output torque. An upper primary pinion (20) of the upper primary reduction gear (22) meshes with the upper driving gear (11). Consequently, the entire lower part (50) rotates to the desired position.

Having explained both the upper locking mechanism and an upper rotation mechanism for the lower part (50) about the second principal axis of rotation (B), an explanation will now be given of a lower locking mechanism and a lower rotation mechanism about the first principal axis of rotation (A).

Figure 10:
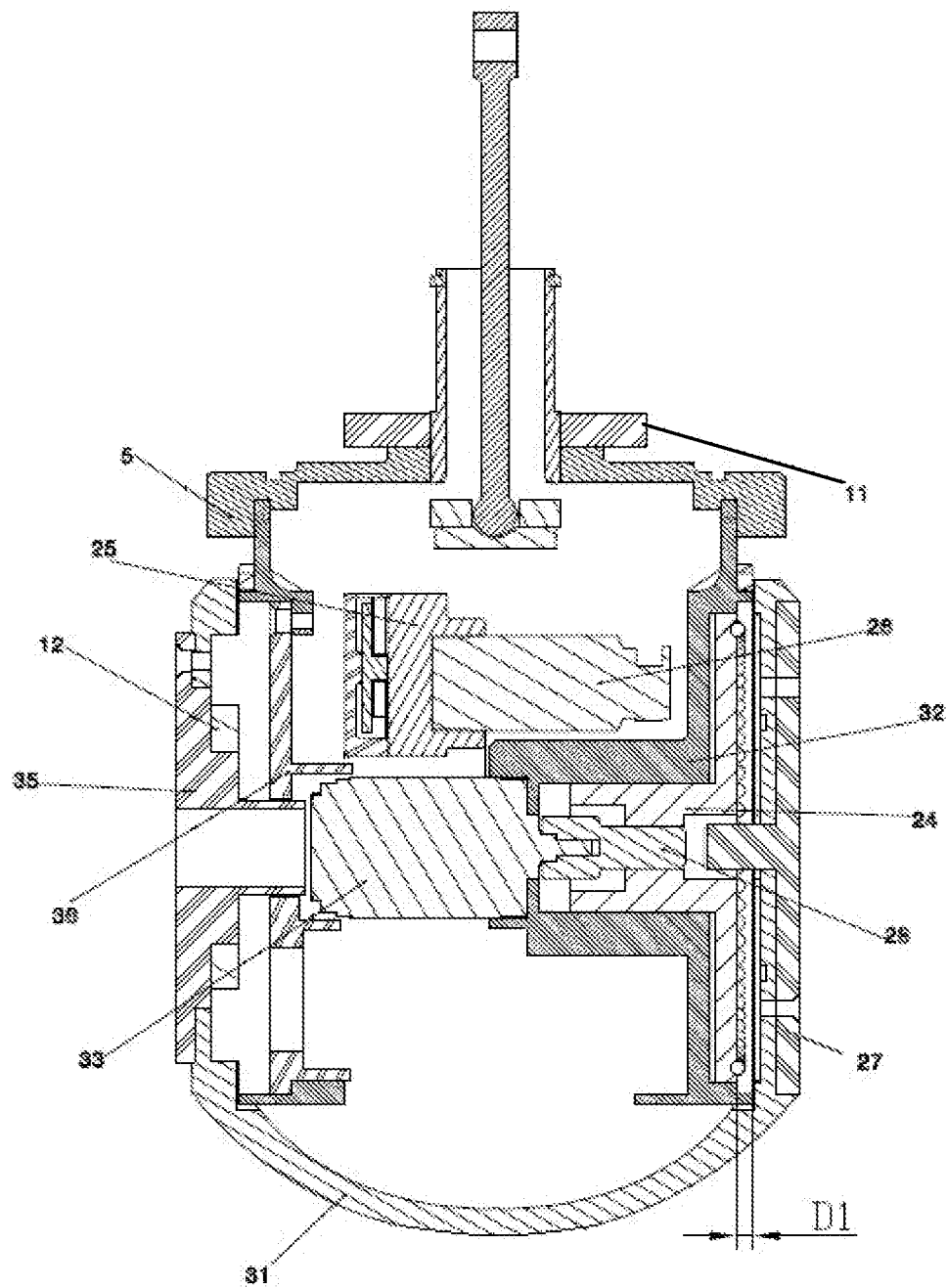
FIG. 10—Shows the cross section of the lower locking mechanism in the lower unlocked position.
Figure 11:
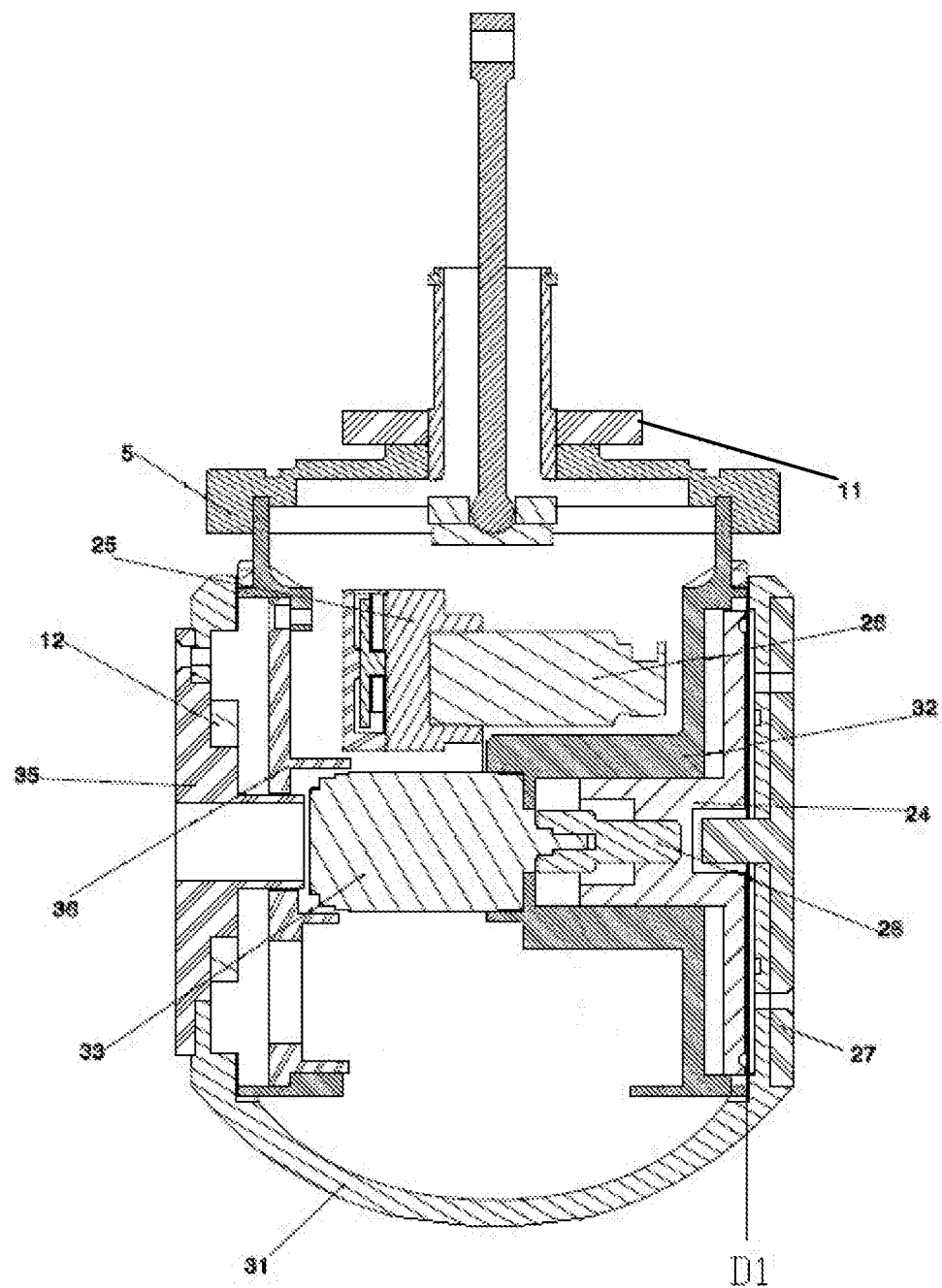
FIG. 11—Shows the cross section of the lower locking mechanism in the lower locked position.

FIG. 10 illustrates that the lower part (50) includes the lower casing (5), an internal casing (32), an external casing (31), and a lower anchoring part (24). The external casing (31) is rotatable about the first principal axis of rotation (A) relative to lower casing (5) and the internal casing (32). The lower locking mechanism locks the external casing (31) against rotation relative to the internal casing (32) through the lower anchoring part (24), lower locking balls (39), and lower locking cylinders. The lower rotation mechanism rotates the external casing (31) relative to the internal casing (32). FIG. 10 illustrates the lower locking mechanism in the lower unlocked position. Meanwhile, FIG. 11 illustrates the lower locking mechanism in the lower locked position. As can be seen, the only variation between FIGS. 10 and 11 is the longitudinal movement (D1) experienced by the lower anchoring part (24) along the first principal axis of rotation (A).

To lock rotation of the external casing (31) about the first principal axis of rotation (A) relative to the internal casing (32), an array of lower locking balls (39) are disposed on the lower anchoring part (24). When the lower locking mechanism is in the lower locked position, the lower locking balls (39), arranged circumferentially every 5° about the first principal axis of rotation (A), interact with three pairs of lower locking cylinders, each pair of lower locking cylinders arranged with a circumferential separation of 120° about the first principal axis of rotation (A). The lower locking balls and the lower locking cylinders engaged in a similar manner to the manner in which the upper locking balls (38) and the upper locking cylinders (37) engage to lock rotation of the lower part (50) relative to the upper part (40).

Figure 9:
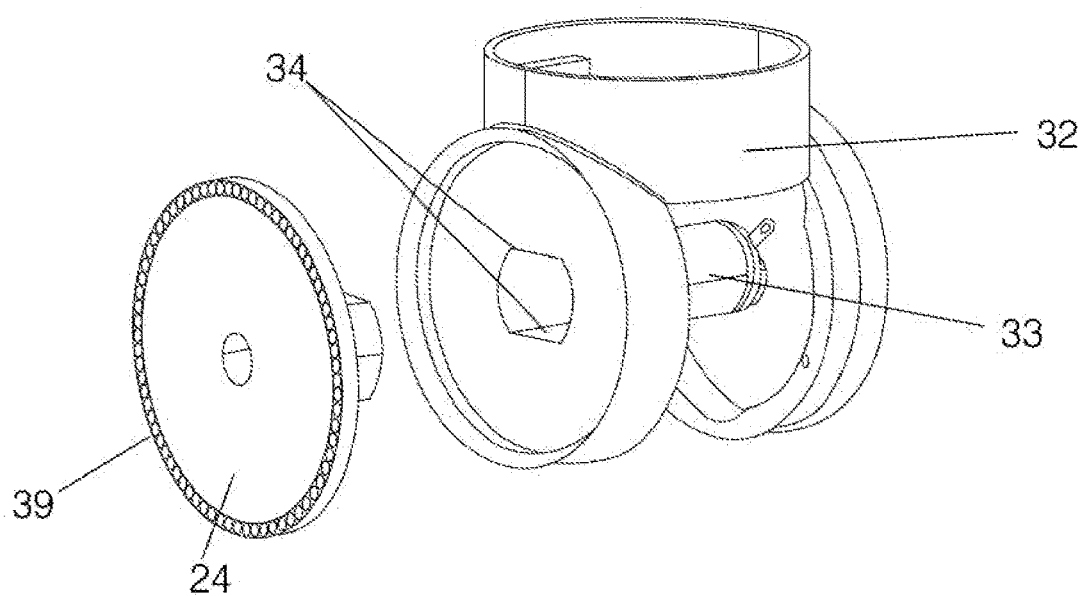
FIG. 9—Shows a detail of the guiding areas in the lower part.

The internal casing (32) houses a lower secondary servomotor (33) which incorporates a threaded shaft (28). The threaded shaft (28) is inserted into a threaded hole in the lower anchoring part (24). Once the lower secondary servomotor (33) begins to operate, a rotational direction of the threaded shaft will determine whether the lower anchoring part (24) moves toward a first external casing cover (27) attached to the external casing (31) or toward an internal casing cover (36) attached to the internal casing (32). The lower anchoring part (24) is disposed between the first external casing cover (27) and the internal casing cover (36) along a direction parallel to the first principal axis of rotation (A). As illustrated in FIG. 9, the internal casing (32) includes two flat guide areas (34) that interact with the lower anchoring part (24) to prevent the lower anchoring (24) from rotating and limiting the lower anchoring part (24) to linear motion through a distance (D1).

One of the differences between the upper locking mechanism and the lower locking mechanism is that, in the upper locking mechanism the upper locking balls (38) are disposed on the upper base (1), which is a stationary part, while the lower locking balls (39) are disposed on the lower anchoring part (24) which is a moving part. By preventing rotation of the lower anchoring part (24) through the two flat guide areas, the lower locking balls (39) can maintain their circumferential position about the first principal axis of rotation (A) even though they have relative linear movement.

Having explained the lower locking system, an explanation will now be given of the lower rotation mechanism. The lower rotation mechanism is similar to the upper rotation mechanism.

The lower part (50) includes a second external casing cover (35) for the external casing (31). A lower driving gear (12) is connected to the second external casing cover (35). A lower principal servomotor (26) attached to a lower principal reduction gear (25) which, by means of a transmission system using gears, connects to and drives the lower drive gear (12), which rotates the external casing (31).

As far as the lower locking mechanism is concerned, the lower locking mechanism is completely independent of the upper locking mechanism.

The invention claimed is:

1. An indexing head comprising:
    a first principal axis of rotation (A) corresponding to a horizontal axis and a second principal axis of rotation (B) corresponding to a vertical axis;
    an upper part (40) comprising: an upper base (1);
    a lower part (50) comprising: a lower casing (5), an internal casing (32), an external casing (31), and a lower anchoring part (24);
    an upper locking mechanism arranged in the upper part and operable between an upper locking position and an upper unlocking position, when the upper locking mechanism is in the upper locking position the upper locking mechanism prevents rotation of the lower part about the second principal axis of rotation relative to the upper part, when the upper locking mechanism is in the upper unlocking position the lower part being rotatable about the second principal axis of rotation relative to the upper part by an upper rotation mechanism, the upper rotation mechanism includes an upper principal servomotor (21) for rotating the lower part (50) about the second principal axis of rotation (B);
    a lower locking mechanism arranged in the lower part (50) and operable between a lower locking position and a lower unlocking position, when the lower locking mechanism is in the lower locking position the lower locking mechanism prevents rotation of the external casing about the first principal axis of rotation relative to the internal casing, when the lower locking mechanism is in the lower unlocking position the external casing being rotatable about the first principal axis of rotation relative to the internal casing by a lower rotation mechanism, the lower rotation mechanism including a lower principal servomotor (26) for rotating the external casing (31) about the first principal axis of rotation (A);
    the upper locking mechanism comprising: an anchor gear (4), a lever (2), an L-shaped part (8), a supporting rod (7), an upper secondary servomotor (14), a transmission system connecting the upper secondary servomotor to the anchor gear (4), springs (18), an array of upper locking balls disposed on the upper base, and upper locking cylinders disposed on the lower casing, the supporting rod (7) is connected to the lower casing, the lever including inclined portions, each inclined portion having a respective flat area extending perpendicularly to the second principal axis of rotation (B), each respective flat area having a respective stop disposed adjacent to the respective flat area;

wherein moving the upper locking mechanism from the upper unlocking position to the upper locking position comprises: the upper secondary servomotor, through the transmission system, rotating the anchor gear (4) in a first circumferential direction about the second principal axis of rotation (B) which rotates the lever (2) about the second principal axis of rotation (B) which causes the L-shaped part (8) to slide along the inclined portions of the lever (2) and rotate about a transverse axis in a first transverse rotational direction such that the L-shaped part (8) moves the supporting rod (7) upwards which moves the lower casing (5) towards the upper part which engages the upper locking balls with the upper locking cylinders, the respective stops limiting angular rotation of the lever in the first circumferential direction beyond the respective stops when the upper locking mechanism is moving from the upper unlocking position to the upper locking position;

wherein the lever (2) is guided by a ball bearing system (3) which is inserted in a positioning disc (10);

wherein moving the upper locking mechanism from the upper locking position to the upper unlocking position comprises: rotating the anchor gear in a second circumferential direction opposite to the first circumferential direction such that the springs, which bias the L-shaped part in a second transverse rotational direction which is opposite from the first transverse rotational direction, cause the upper locking mechanism to move from the upper locking position to the upper unlocking position;

each spring being disposed within a respective opening (19), each respective opening (19) including a respective set screw, each respective set screw capable of varying a respective preload force of the respective spring applied to the L-shaped part to bias the L-shaped part in the second transverse rotational direction;

wherein the lower casing (5) is attached to an upper sleeve (42) and supports an upper driving gear (11), when the upper locking mechanism is in the upper unlocked position a ring (9) disposed on the upper sleeve is supported by the upper base the lower locking mechanism comprises: a lower anchoring part (24), an array of lower locking balls disposed on the lower anchoring part, lower locking cylinders, and a lower secondary servomotor (33);

wherein moving the lower locking mechanism from the lower unlocking position to the lower locking position comprises: the lower secondary servomotor linearly moving the lower anchoring part to cause the lower locking balls to engage the lower locking cylinders which locks the external casing (31) against rotation about the first principal axis of rotation (A).

* * * * *